United States Patent [19]
Bartholomeusz

[11] Patent Number: 5,477,520
[45] Date of Patent: Dec. 19, 1995

[54] SYSTEM AND METHOD FOR HIGH RESOLUTION OPTICAL RECORDING USING AN INDUCED SHIFT IN MEDIA ABSORPTION

[75] Inventor: Brian J. Bartholomeusz, Pittsford, N.Y.

[73] Assignee: Eastman Kodak Company, Rochester, N.Y.

[21] Appl. No.: 296,560

[22] Filed: Aug. 26, 1994

[51] Int. Cl.$^6$ .................................................... G11B 7/00
[52] U.S. Cl. .................... 369/100; 369/120; 369/125; 430/495
[58] Field of Search .................................... 369/100, 110, 369/116, 120, 121, 125; 359/254, 297; 365/215; 430/495; 428/64

[56] References Cited

U.S. PATENT DOCUMENTS

| | | | |
|---|---|---|---|
| 4,845,529 | 7/1989 | Pearson et al. | 369/125 |
| 5,063,556 | 11/1991 | Chikuma | 369/100 |
| 5,099,270 | 3/1992 | Pearson et al. | 369/100 |
| 5,219,823 | 6/1993 | Chapman | 503/227 |
| 5,248,538 | 9/1993 | Kovacs et al. | 428/64 |
| 5,272,047 | 12/1993 | Kovacs et al. | 430/495 |
| 5,297,128 | 3/1994 | Yamaguchi et al. | 369/116 |

OTHER PUBLICATIONS

B. Bartholomeusz, "Laser–induced surface heating," J. Appl. Phys., vol. 73 (3), pp. 1066–1072, Feb. 1993.
B. Bartholomeusz, "Thermal modeling studies of organic compact disk–writable media," *Applied Optics, vol. 31, No. 7, pp. 909–918, Mar. 1992*.
B. Bartholomeusz, "Laser marking of thin organic films," Applied Optics, vol. 31, No. 23, pp. 4829–4833, Aug. 1992.

*Primary Examiner*—Loha Ben
*Attorney, Agent, or Firm*—Raymond L. Owens

[57] ABSTRACT

A system and method for recording data on an optical recording medium. One system in accordance with the invention includes an optical source to generate a radiation beam at a first wavelength; and an optical recording medium to which the radiation beam is applied, wherein the medium has an absorption response with an absorption edge between a second and third wavelength, and the first wavelength is between the second and third wavelength, such that an amount of radiation absorbed by the medium varies as a function of wavelength for wavelengths near the first wavelength. The radiation beam induces a shift in the absorption response in a region of the medium illuminated by the beam such that the medium absorbs additional radiation at the first wavelength and the quality of a mark formed on the medium by the beam is thereby improved.

20 Claims, 3 Drawing Sheets

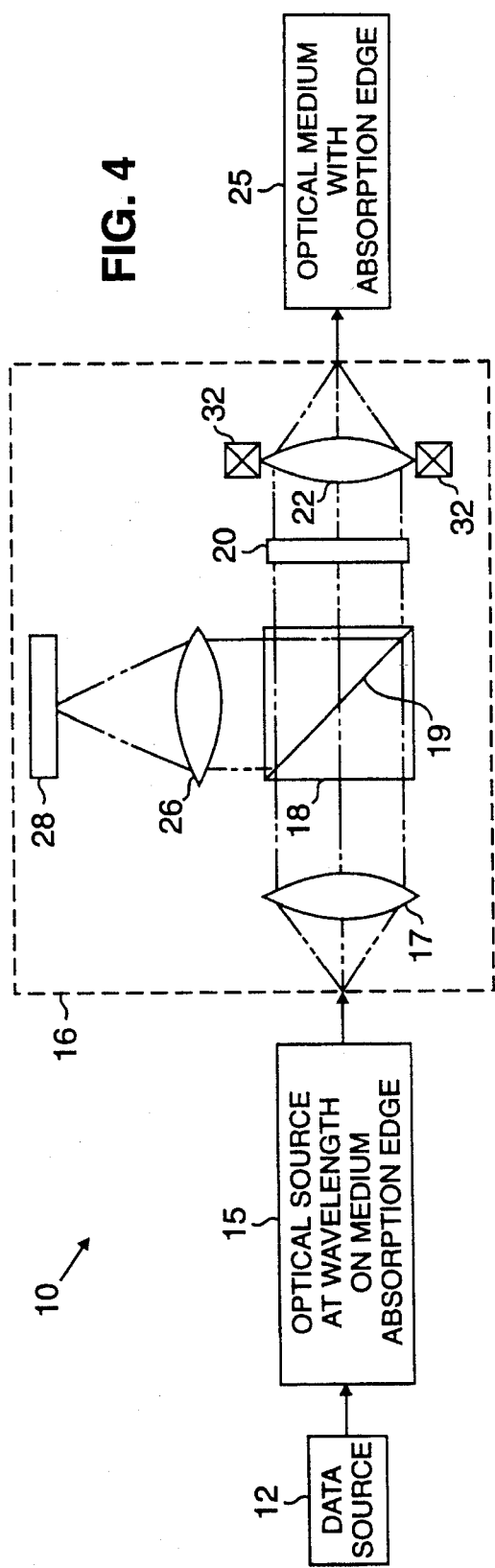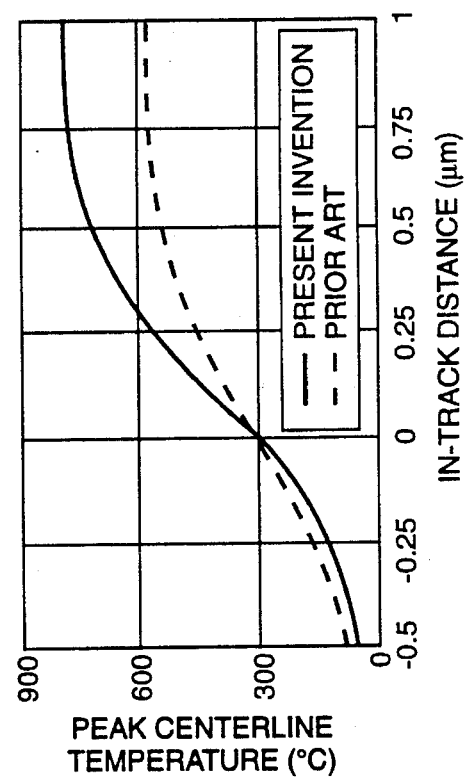
FIG. 4
FIG. 5

SYSTEM AND METHOD FOR HIGH RESOLUTION OPTICAL RECORDING USING AN INDUCED SHIFT IN MEDIA ABSORPTION

CROSS-REFERENCE TO RELATED APPLICATIONS

The present invention is related to U.S. patent application Ser. No. 08/297,063, entitled "A System and Method for High Resolution Optical Recording Using Dual Optical Sources and an Induced Shift in Media Absorption" by B. Bartholomeusz and U.S. patent application Ser. No. 08/297,064, entitled "Dual Source Optical Recording System With an Unmodulated Short-Wavelength Radiation Beam" by E. Gage et al., which are assigned to the assignee of the present invention and filed concurrently herewith. The disclosures of these related Applications are incorporated herein by reference.

FIELD OF THE INVENTION

The present invention relates generally to optical data recording. More particularly, the present invention relates to an improved single-source optical recording system which utilizes an induced shift in media absorption to record high resolution data on an optical recording medium.

DESCRIPTION OF THE PRIOR ART

Many available optical recording media are designed to provide a relatively high reflectance at recording radiation beam wavelengths. For some types of media, such as recordable compact disks (CDs), this may be the result of compliance with standardization requirements established by equipment and media manufacturers. The high reflectance is often desirable in order to, for example, provide sufficient reflected power to drive focus and tracking servo systems. Many recordable CDs are therefore designed to have a reflectance response as a function of wavelength which includes a high reflectance at the recording beam wavelength and a sharply lower reflectance at shorter wavelengths. Such media are also typically designed such that the reflectance remains at its relatively high value during recording despite variations in the media response resulting from, for example, heating effects of the recording beam. The recording beam wavelength is therefore generally set to a wavelength value falling in a relatively constant region of the media absorption response.

As a result of the desire for high initial reflectance at the recording beam wavelength, many optical media are designed to provide just enough absorption to meet minimum requirements for proper mark formation. Prior art recording systems thus often balance the conflicting requirements of high reflectance and high absorption by providing a minimal but relatively constant amount of absorption, and generally do not include any mechanism for increasing absorption during recording. Unfortunately, operating so close to the minimum required absorption may cause significant problems. For example, media sensitivity, media heating rate during recording, and other factors which influence mark formation quality are dependent upon the absorption at the recording beam wavelength, and insufficient absorption during recording can therefore result in improper or inconsistent mark formation.

As is apparent from the above, a need exists for an optical recording system and method which provide a sufficiently high initial reflectance at the recording beam wavelength along with significantly increased absorption during recording.

SUMMARY OF THE INVENTION

The present invention provides a system and method for optical data recording which uses a recording radiation beam selected to have a wavelength on or near an absorption edge of a media absorption response. During recording, the beam induces a shift in the absorption response of an illuminated region of the media, such that a sufficiently high reflectance is provided for focus and tracking servos, and a lower reflectance, or higher absorption, is provided during mark formation.

In accordance with one aspect of the present invention, an optical recording system is provided which includes an optical source to generate a radiation beam at a first wavelength, wherein the first wavelength is between a second and a third wavelength, and the radiation beam is modulated by recording data; and an optical recording medium to which the radiation beam is applied, the medium having an absorption response with an absorption edge between the second and the third wavelength such that an amount of radiation absorbed by the medium varies as a function of wavelength for wavelengths between the second and third wavelength; wherein the radiation beam induces a shift in the absorption response in a region of the medium illuminated by the beam such that the medium absorbs additional radiation at the first wavelength and the quality of a mark formed on the medium by the beam is improved relative to that of a mark formed by the beam without the shift in the response. The absorption edge may include, for-example, a substantial decrease in absorption from a second wavelength to a longer third wavelength.

In accordance with another aspect of the present invention, a method of recording data on an optical recording medium is provided. The exemplary method includes the steps of generating a radiation beam at a first wavelength, wherein the first wavelength is between a second and a third wavelength; modulating the radiation beam with data to be recorded on the medium; providing an optical recording medium having an absorption response with an absorption edge between the second and third wavelength such that an amount of radiation absorbed by the medium varies as a function of wavelength for wavelengths between the second and third wavelength; applying the radiation beam to the recording medium; and inducing a shift in the absorption response of the recording medium such that the medium absorbs additional radiation at the first wavelength and mark formation quality is thereby improved relative to recording without the shift in the response.

In accordance with another aspect of the present invention, the optical recording medium may include a transparent substrate, a masking layer underlying the substrate, and a data storage layer underlying the masking layer. The masking layer, in response to the incident beam, exhibits a shift in absorption response such that, for example, additional radiation at the first wavelength is transmitted through the masking layer and absorbed by the underlying data storage layer.

The present invention uses a radiation beam with a wavelength on or near an absorption edge of an optical recording medium to improve the mark formation process. By providing a high initial reflectance and increased absorption during recording, the sensitivity and heating rate of the media is increased, higher quality marks are consistently formed, and read-back data signal jitter is significantly reduced. In addition, a lower power optical source may be used, and improved recording system design flexibility is thereby provided.

Further features of the invention, its nature and various advantages will become more apparent from the accompanying drawings and the following detailed description of the invention.

BRIEF DESCRIPTION OF THE DRAWINGS

FIG. 4 shows an exemplary optical recording system in accordance with the present invention.

FIG. 5 shows an exemplary improvement in centerline temperature distribution for a mark formed in an optical system of the present invention.

DETAILED DESCRIPTION OF THE PREFERRED EMBODIMENTS

Figure 1:
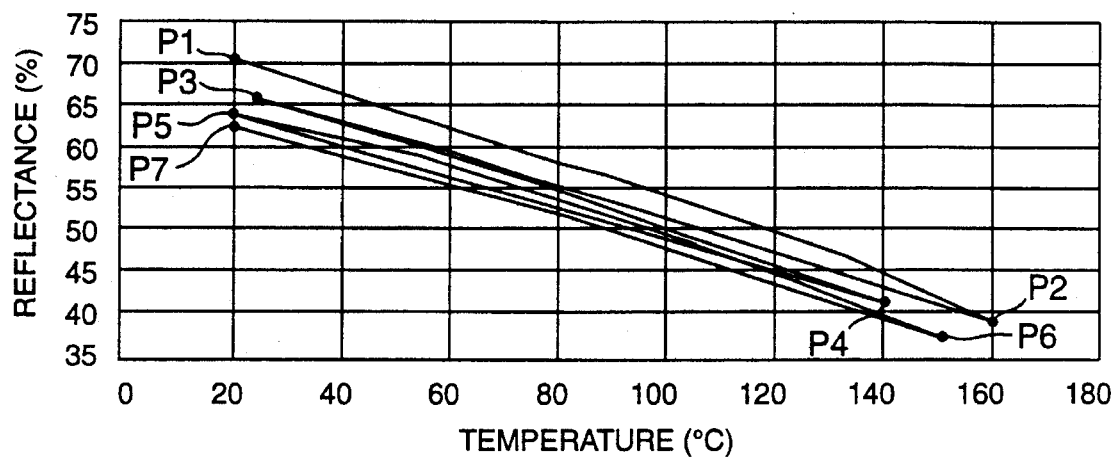
FIG. 1 is a graph of reflectance as a function of temperature for an exemplary optical recording medium at a wavelength of 780 nanometers, illustrating thermally-induced reductions in media reflectance.

The present invention is based in part on the discovery that many optical recording media exhibit substantial changes in reflectance at certain wavelengths as a function of temperature. FIG. 1 shows changes in media reflectance, as a function of temperature and at a wavelength of 780 nanometers, for an exemplary optical recording medium suitable for use in the present invention. Reflectance, also known as reflectivity, generally refers to the percentage of incident radiation reflected from the optical medium, while absorption refers to the percentage of incident radiation absorbed by the medium. In general, any radiation which is not reflected by the medium is considered herein to be absorbed by the medium. The exemplary medium is a dye-based recording medium of the type described in U.S. Pat. No. 5,272,047, which is incorporated by reference herein. Reflectance of the medium was measured over three thermal cycles from an approximately ambient temperature to a temperature on the order of 150° C. The temperature end points in the thermal cycles are denoted by points P1 through P7 in FIG. 1, and the thermal cycles proceed in the order P1-P2-P3-P4-P5-P6-P7. The results demonstrate that the exemplary dye-based medium exhibits a significant reduction in reflectance with temperature at a wavelength of 780 nanometers. Although the reflectance values near the end points of each cycle are not exactly the same, the reflectance reductions are substantially reversible and repeatable. The present invention takes advantage of such changes in reflectance with temperature to provide substantial improvements in media sensitivity and mark formation during recording.

As noted above, prior art systems generally avoid, rather than utilize, such reflectance changes.

Figure 2:
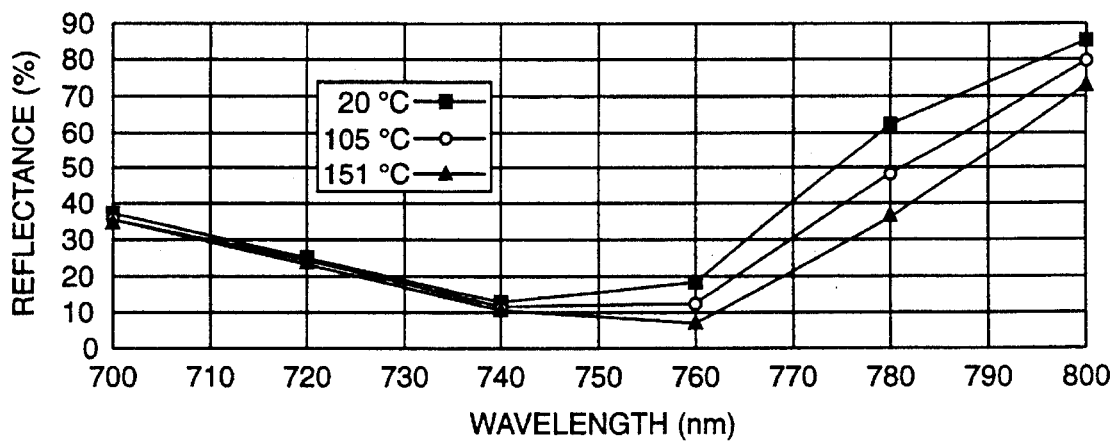
FIG. 2 shows unshifted and shifted absorption responses for an exemplary optical recording medium suitable for use in the present invention.

FIG. 2 compares shifted and unshifted absorption responses for an exemplary optical recording medium suitable for use in the present invention. An absorption response generally indicates the percentage of incident radiation absorbed by a given medium over a range of wavelengths. The curve with data points designated by squares corresponds to the unshifted absorption response of the exemplary conventional dye-based medium at an ambient temperature of about 20° C. The portion of the absorption response curve which exhibits a substantial change in reflectance, and thus a substantial change in absorption, is referred to herein as an absorption edge. A substantial change in absorption is defined herein to include a change of at least ten percent in absorption value, and may be either an increase or a decrease in absorption value. In this example, the medium absorption response at ambient temperature includes an absorption edge between wavelengths of about 750 and 800 nanometers. This absorption edge represents a decrease in absorption value of about 70% over the wavelength range of 750 to 800 nanometers, from an absorption value of about 85% to an absorption value of about 15%, corresponding to plotted reflectance values of about 15% and 85%, respectively. It should be noted that this and all other references herein to percentage changes in absorption refer to an actual percentage of radiation absorbed rather than a percentage of a given absorption value.

The shifted absorption response curves in FIG. 2, with data points designated by circles and triangles, illustrate wavelength shifts in the ambient absorption response of a region of the medium upon heating the region to 105° C. and 151° C., respectively. This result is in accordance with the thermal cycle results shown in FIG. 1. It can be seen that the absorption response in each case shifts toward longer wavelengths, or to the right in FIG. 2, such that the absorption value at a given wavelength, such as 780 nanometers, is significantly increased as a function of temperature. For example, the absorption response curve corresponding to 105° C. indicates that the medium absorbs about 52% of the incident radiation at 780 nanometers, as compared with an absorption value of about 38% at ambient temperature. This represents absorption of an additional 14% of the incident radiation. Although preferred embodiments of the present invention will generally absorb an additional amount of radiation in the range between about 10% and 50%, other embodiments could absorb different additional amounts of radiation, such as 5%.

The absorption responses of FIG. 2 are exemplary only. For example, the shape of the absorption response need not be as shown in FIG. 2. The response could exhibit any number of different shapes and still be effectively utilized in accordance with the present invention. In general, the present invention may be utilized with any medium which exhibits an absorption response with a given absorption at one wavelength, a different absorption at another wavelength, and a shift in the response from the one wavelength to the other during recording. The radiation beam wavelength may be set to the lower absorption wavelength, and during optical recording the heating effects of the beam alter the absorption response in a region of the medium such that the higher absorption occurs at the radiation beam wavelength. The term "shift in absorption response" is defined herein to include any change in the medium absorption response which permits the medium to absorb an amount of radiation at the incident radiation beam wavelength which was previously absorbed at another wavelength. It should be noted that the shift need not be substantially reversible or repeatable.

Optical media which may be designed to exhibit such an induced shift in absorption response, and which are therefore suitable for use with the present invention, include media based on cyanine, pthalocyanine, and azo dyes, as well as media utilizing certain organometallic and inorganic materials. These and other types of suitable media are described in, for example, U.S. Pat. Nos. 5,219,823, 5,248, 538 and 5,272,047, and U.S. patent applications 08/011,606, now U.S. Pat. No. 5,294,471, 08/083,836, now U.S. Pat. No. 5,288,691, 08/137,331, now U.S. Pat. NO. 5,426,015, 08/140,641 and 08/140,646, all of which are assigned to the assignee of the present invention, and incorporated by reference herein. In general, any of a number of other types of optical media could be designed and constructed by one skilled in the art to exhibit a reduced absorption at one wavelength relative to another wavelength, and an appropriate absorption shift.

Although the absorption responses shown in FIG. 2 exhibit an absorption edge which shifts to longer wavelengths with increasing temperature, this is by way of example and not limitation. Other embodiments of the present invention could utilize a medium in which an absorption edge shifts to shorter wavelengths with increasing temperature. In either case, the shift in the absorption edge may be utilized to provide an increase in absorption at the radiation beam wavelength during mark formation. Furthermore, although FIGS. 1 and 2 illustrate an embodiment in which absorption increases with temperature, it should be understood that the present invention may also be advantageously utilized with optical media which exhibit a decrease in absorption with increasing temperature. Of course, those skilled in the art will be able to utilize the teachings of the present invention with media exhibiting these and any of a number of other absorption responses.

Figure 3:
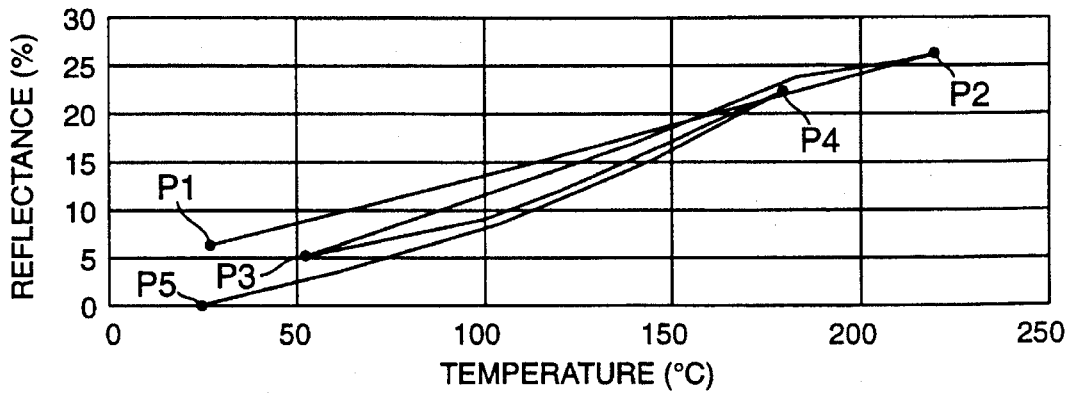
FIG. 3 shows a graph of reflectance as a function of temperature for another exemplary optical recording medium at a wavelength of 780 nanometers, illustrating thermally-induced increases in media reflectance.

FIG. 3 shows a graph of reflectance as a function of temperature for another exemplary optical recording medium at a wavelength of 780 nanometers, illustrating thermally-induced increases in media reflectance, corresponding to decreases in absorption. In general, parameters such as the thickness of the medium will influence whether the absorption increases or decreases with temperature. As a result, different absorption responses may often be obtained at different medium thicknesses for the same type of medium. For example, the exemplary medium exhibiting the reflectance variations shown in FIG. 3 may be of the type described in U.S. Pat. No. 5,272,047, but with a different thickness than the medium used in conjunction with FIGS. 1 and 2. Those of ordinary skill in the art can readily determine appropriate media thicknesses to produce a response similar to that of FIG. 3 using any of a number of other media.

Two thermal cycles are shown in FIG. 3, with temperature end points denoted by points P1 through P5. The cycles proceed in the order P1-P2-P3-P4-P5. Again, although the reflectance values near the end points of each cycle are not exactly the same, the reflectance changes are substantially reversible and repeatable. Applications in which a decrease in absorption with increasing temperature could be advantageously utilized include, for example, prevention of thermal damage during optical recording. In such an application, a decrease in absorption with increasing temperature could be used to minimize the peak temperatures customarily obtained at the center of a region illuminated by a focused radiation beam, relative to the periphery of that region. This will generally result in a significantly more uniform and better controlled heating of the illuminated region.

FIG. 4 shows an exemplary optical recording system 10 in accordance with the present invention. Although primarily referred to herein as a recording system, the system 10 may also be used to read data recorded on an optical medium. The system 10 is shown for purposes of illustration only, and should not be construed as limiting the present invention to use with only certain types of optical systems. For example, other systems implementing the present invention may include any of a number of different arrangements of optical components, such as reflectors, lenses, beam splitters and prisms, to direct and process the radiation beam in a manner other than that shown in FIG. 4. In additional, the present invention may be used in, for example, magneto-optic (MO) recording systems, or parallel recording systems, such as digital optical tape systems. Furthermore, although the present invention is particularly well-suited for use in optical recording systems, it may also provide advantages in other optical applications, including, for example, laser printing.

The optical recording system 10 of FIG. 4 includes a data source 12, which supplies a stream of recording data to an optical source 15. The optical source 15 may be, for example, a laser diode, a light emitting diode (LED) or a laser, and operates at a first wavelength $\lambda_1$ which, in accordance with one embodiment of the present invention, is on an optical medium absorption edge. In other embodiments, the first wavelength may be selected to be near, rather than on, an absorption edge occupying less than the entire wavelength range between a second and a third wavelength. For purposes of the present invention, a first wavelength within about 50 nanometers of an absorption edge is considered near that edge. The recording data from source 12 directly modulates a radiation beam generated at wavelength $\lambda_1$ by the optical source 15. The radiation beam produced by optical source 15, also referred to as a write beam or a recording beam, is supplied to optical hardware 16, which directs the radiation beam onto an optical medium 25, and processes a return beam reflected from the medium. The exemplary optical hardware 16 includes a collimating lens 17 for collimating the radiation beam from source 15. The collimated radiation beam is transmitted through a polarization beam splitter 18 and applied to a quarter-wave plate 20. The polarization beam splitter 18 transmits a linear polarization of the radiation beam, such as a p-polarization, and quarter-wave plate 20 provides a circular polarization to the linearly polarized radiation beam. The circularly polarized radiation beam from quarter-wave plate 20 is focused by a lens 22 onto one of a number of data tracks on optical recording medium 25. The lens 22 may be an objective lens, or any other lens suitable for focusing the incident beam onto the medium. The medium 25 has an absorption response which includes an absorption edge, such as that described above in conjunction with FIG. 2. The radiation beam records data on the medium 25 in the form of marks, as is well-known in the art. The marks are generally formed on data tracks arranged in a spiral or in concentric circles on a data storage surface of a data storage layer in recording medium 25. The recording medium 25 may be any optical recording medium, including a dye-based medium, a phase-change medium, a magneto-optic medium, or an ablative medium, which exhibits the desired shift in absorption response. The structures of such media are generally well-known in the art, and often include, for example, a transparent substrate overlying the data storage layer.

As a result of the thermally-induced shift in the absorption response described above, an illuminated region of the medium absorbs an increased amount of optical energy from the incident radiation beam. This increased amount of energy causes the total energy absorbed at the first wavelength to exceed the recording threshold power PTH within the region illuminated by the radiation beam, such that the medium may be marked within that region.

The incident radiation beam is reflected from the data storage surface of the medium 25. The resulting radiation beam, referred to herein as a return beam, is collimated by lens 22 and then passes through the quarter-wave plate 20. The quarter-wave plate 20 converts the circular polarized return beam to a linear s-polarized return beam. The linear s-polarization is perpendicular to the linear p-polarization of the radiation beam transmitted from polarization beam splitter 18. When the s-polarized return beam is applied to the polarization beam splitter 18, it is reflected by a surface 19 of the beam splitter 18. The surface 19 may be, for example, a multilayer coating which transmits p-polarized light and reflects s-polarized light. A detector focusing lens 26 converges the return beam onto a detector array 28 which generally includes a number of detectors for detecting portions of the return beam. Signals from the detectors in detector array 28 may be combined to generate focus and tracking error signals, and a data signal, in a manner well-known in the art. The focus and tracking error signals may be used to control an actuator 32 which alters the position of lens 22 in order to maintain the radiation beam in-focus and on-track, respectively, relative to the optical recording medium 25. The data signal is indicative of data recorded on the data track of medium 25 scanned by the incident radiation beam. The portion of the optical system 10 which generates and processes the incident and return beams is often referred to as an optical head.

It should be understood that the connection of data source 12 to optical source 15 in FIG. 4 is exemplary only. The embodiment shown illustrates direct modulation of optical source 15 by the recording data, resulting in a modulated radiation beam at the source output. In alternative embodiments, the first radiation beam could be indirectly modulated by the recording data using an optical modulator (not shown) connected to data source 12 and placed in the path of the radiation beam. In other embodiments of the present invention, one or more additional optical sources may be used in the recording process. For example, a second radiation beam from a second optical source could be combined with the first beam. The above-cited U.S. application Ser. No. 08/297,063, entitled "A System and Method for High Resolution Optical Recording Using Dual Optical Sources and an Induced Shift in Media Absorption," discloses a system and method in which one beam is used to induce an absorption shift in an illuminated region of the medium such that the medium absorbs additional radiation in that region from another beam at a different wavelength.

Figure 6:
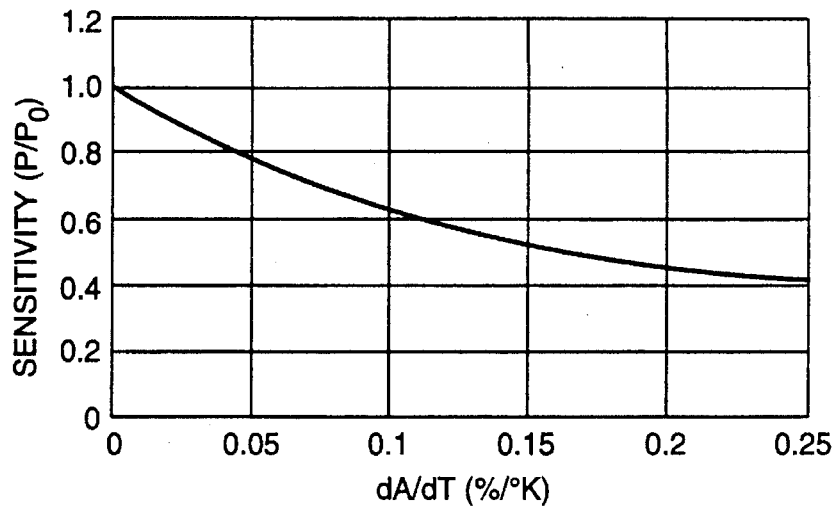
FIG. 6 shows predicted media sensitivity enhancement, as a function of temperature coefficient of absorption, in an optical system of the present invention.
Figure 7:
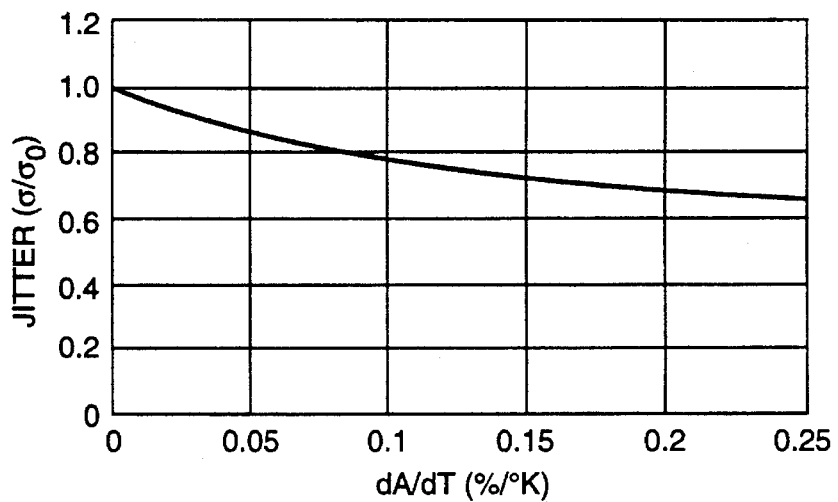
FIG. 7 shows predicted reduction in read-back data signal jitter, as a function of temperature coefficient of absorption, in an optical system of the present invention.

FIGS. 5–7 illustrate performance improvements possible using the system of FIG. 4, with an optical medium having the absorption response characteristics shown in FIG. 2. Optical source 15 was selected to operate at a first wavelength $\lambda_1$ of about 780 nanometers, which was within an absorption edge exhibited at ambient temperature by the medium 25 between a second wavelength $\lambda_2$ of 750 nanometers and a third wavelength $\lambda_3$ of 800 nanometers. Of course, in other embodiments the absorption edge may occupy only a portion of the wavelength range between the second and third wavelength, and the first wavelength may be near, rather than on, the absorption edge. The medium 25 thus had a reflectance greater than 60% prior to mark formation, which is generally considered adequate to provide proper focus and tracking error servo signals. Application of the 780 nanometer radiation beam induced a shift in the absorption response of an illuminated region of the medium, such that the reflectance in that region decreased to less than 40%. An increase in absorption value from less than 40% to greater than 60% was thus obtained, resulting in improved mark formation as described in greater detail below.

FIG. 5 shows an exemplary improvement in centerline temperature distribution for a mark formed in an optical system of the present invention. The centerline temperature distribution indicates the temperature distribution within a region illuminated by the incident radiation beam, and is measured as a function of in-track distance in micrometers. An in-track distance of zero represents the point at which the peak centerline temperature crosses the mark formation temperature threshold, assumed in this case to be 300° C. A steeper temperature distribution will generally reduce the sensitivity of the recording process to various system and media irregularities or non-uniformities, and leads to a reduction in mark length variability and thereby to reduced read-back data signal jitter. The dashed-line distribution corresponds to a mark formed in an optical recording system in accordance with the prior art, in which a relatively high reflectance value is maintained during the recording process. The solid-line distribution corresponds to a mark formed in the exemplary system of the present invention described above, in which a first wavelength $\lambda_1$ of 780 nanometers is used with an optical medium having an absorption edge between second and third wavelengths $\lambda_2$, $\lambda_3$ of about 750 and 800 nanometers, respectively. It can be seen that the solid-line distribution is steeper in the region corresponding to the leading edge of a mark, indicating that mark length variability will be reduced relative to that in the prior art system. Similar improvements in temperature distributions will generally result at the trailing edge of a mark.

FIG. 6 shows predicted media sensitivity enhancement as a function of temperature coefficient of absorption in an optical system of the present invention. The media sensitivity improvement is measured relative to a system which uses a conventional prior art recording technique. The sensitivity is given by the quantity $P/P_0$, in which P corresponds to the radiation beam power level required for proper mark formation in the exemplary system of the present invention, and $P_0$ corresponds to such a power level in the prior art system. The sensitivity is measured as a function of the temperature coefficient of absorption, dA/dT, which represents the rate of change in media absorption as a function of temperature at the recording beam wavelength. The change in absorption is given in percent, and the temperature in degrees Kelvin. The curve of FIG. 6 indicates that, as the temperature coefficient of absorption increases, such that a greater increase in absorption is provided upon application of the radiation beam, the media sensitivity is increased. It is therefore possible to form high quality marks on the recording medium using a significantly lower power radiation beam. For example, a thermal model of a recording system using a medium with the absorption responses shown in FIG. 2, and a recording beam wavelength selected in accordance with the present invention, has predicted about a 46% reduction in required recording power. Details of the thermal model used to calculate this sensitivity improvement may be found in B. Bartholomeusz, "Laser-induced surface heating," J. Appl. Phys., Vol. 73 (3), pp. 1066–1072, February 1993; B. Bartholomeusz, "Thermal modeling studies of organic compact disk-writable media," Applied Optics, Vol. 31, No. 7, pp. 909–918, March 1992; and B. Bartholomeusz and Mo C. Gupta, "Laser marking of thin organic films," Applied Optics, Vol. 31, No. 23, pp. 4829–4833. Each of these articles is incorporated herein by reference.

FIG. 7 shows predicted reduction in read-back data signal jitter as a function of temperature coefficient of absorption in an optical system of the present invention. The jitter is generally a function of mark length variability. Lower jitter therefore is indicative of improved mark formation quality and consistency. The jitter is shown in FIG. 6 as the quantity $\sigma/\sigma_o$, in which $\sigma$ corresponds to the jitter in a system of the present invention and $\sigma_o$ represents jitter in a prior art system. Again, the improvement is measured as a function of the temperature coefficient of absorption, in percent per degree Kelvin, at the recording beam wavelength. The results indicate a substantial reduction in jitter in the system of the present invention. This reduction may be attributed to the steepening of the temperature distribution at the leading and trailing edges of the marks, as described above in conjunction with FIG. 5.

The teachings of the present invention may be used to provide numerous other performance enhancements in a variety of different optical recording systems. For example, in direct-read-during-write (DRDW) systems, conventional magneto-optic, phase change, and dye-based recording media may exhibit a time lag in the onset of mark formation, which causes a similar time lag in the DRDW signal reflected from the medium. In a system of the present invention, however, a DRDW signal can provide an instantaneous response indicative of the rate of heating in a region to be marked, and therefore can be used to more rapidly and accurately control, for example, a servo loop used to maintain a desired recording beam power level.

The present invention may also be utilized to control or maintain radiation beam power at an appropriate level in non-DRDW systems. For example, in a system of the present invention, any increase in incident recording power could generally produce increased heating of a region of the medium and therefore a change in reflectance. The change in reflectance could be monitored and used to control optical source power level. Such control may be provided at very high control bandwidths, on the order of tens of kilohertz or higher, and would permit, for example, convenient sampling and utilization of the initial and peak intensity levels generally associated with a pulsed laser optical source.

In addition, the present invention could be used to provide a more uniform temperature distribution in an illuminated region of a recording medium. In many optical recording systems, the peak temperatures at or near a mark center are appreciably greater than those at the mark periphery. As the data rate and scanning velocity increase, this discrepancy becomes greater. In some cases, the high peak temperature can result in undesirable effects such as media damage, ablation, and the like. The present invention generally provides a more uniform temperature distribution which may prevent such damage. For example, a medium exhibiting an decreasing absorption with temperature, when used with an appropriately selected recording beam wavelength, would have a significantly more uniform temperature distribution across a given mark due to the self-compensating action of its absorption response. The higher temperature regions of the medium would absorb less radiation, and lower temperature regions would absorb more, thereby resulting in a more uniform distribution. In accordance with the present invention, such a system design could be used to ensure that peak temperatures are kept below damage thresholds, and could be accomplished without a corresponding increase in mark variability. The uniform illumination provided by changes in absorption with increasing incident radiation beam power could also be used compensate for variations in optical source output power.

Another application of the present invention is in the estimation of media temperature in an operating environment. In most optical recording systems, the laser power required to effect marking is a function of the initial medium temperature, which may or may not correspond to ambient temperature or the temperature within the medium drive. By using the dependence of medium reflectance on temperature described herein, the medium temperature may be accurately measured and the recording beam power level adjusted accordingly. The medium temperature could be measured by, for example, comparing a reflected power level, resulting from application of a beam below the recording threshold power level, with a known curve of reflectance as a function of temperature for the given medium. Alternatively, a small area of known and relatively constant reflectance could be incorporated into the medium. This area could include, for example, a metal reflector providing a known reflectance which can be measured and used as a basis for comparison with reflectance measurements from temperature-sensitive portions of the medium.

In other embodiments of the present invention, the recording and readout resolution may be improved by matching the radiation beam wavelength to an absorption edge of a masking layer on the optical recording medium. The masking layer could exhibit a shift in absorption response in response to an incident beam, in a manner similar to that described above. The masking layer could then, for example, selectively transmit only the central portion of the incident beam, because the central portion produces the greatest temperature increase, and resulting absorption shift, in the illuminated region of the masking layer. As a result of the shift in absorption response of the masking layer, the illumination profile of light passing through the masking layer to, for example, an underlying data storage layer, is significantly narrowed. In the context of reading data from the medium, the masking layer thus thermally masks recorded data which lies ahead of or behind a currently-illuminated data bit recorded on the data storage layer of the medium. Use of such a masking layer could provide advantages in both recording and readout operation, such as substantial increases in packing density on the medium, and improved readout data signal quality.

Figure 8:
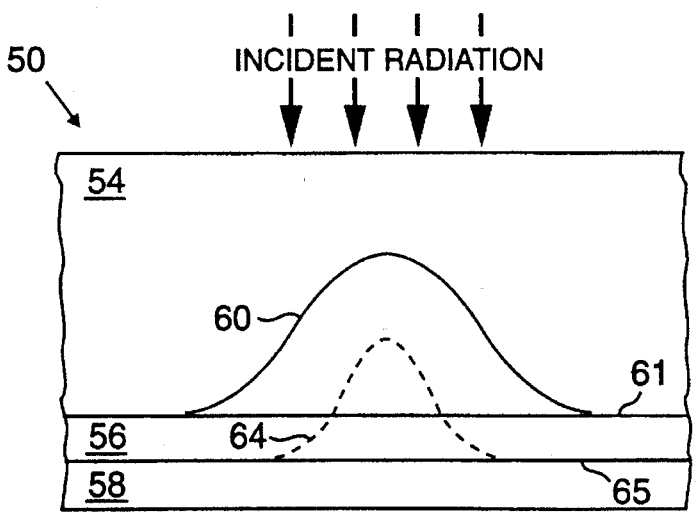
FIG. 8 is a side sectional view of an exemplary optical recording medium with a masking layer exhibiting an induced shift in absorption in accordance with the present invention.

FIG. 8 illustrates an exemplary embodiment of the present invention which utilizes a masking layer to produce a narrower illumination profile on a data storage layer of an optical recording medium. An optical recording medium 50, only a portion of which is shown in FIG. 8, includes a transparent substrate 54, a masking layer 56 and a data storage layer 58. Suitable materials, thicknesses, and optical parameters for each of these layers may vary depending upon the application and can be readily determined by those of ordinary skill in the art. Incident radiation passes through the transparent substrate 54 and forms an illumination profile 60 at the surface 61 of the masking layer 56. The layers 56, 58 are also referred to herein as underlying layers in that the incident radiation passes through another layer, such as substrate 54, before reaching layer 56 or 58. The illumination profile 60 generally corresponds to the intensity of incident radiation distributed along the surface, and therefore also indicates the relative temperatures of points on the surface. For example, the surface point corresponding to the peak of the profile 60 will receive the greatest amount of incident radiation and will therefore have the highest temperature.

The masking layer 56 exhibits high reflectance, and therefore low absorption, at ambient temperatures. The masking layer 56 also has an absorption response which exhibits a shift with temperature, in a manner similar to that described above in conjunction with FIG. 2. The masking layer 56 is designed such that it transmits any radiation which it does not reflect. In the context of the masking layer, any radiation which is not reflected therefrom is also considered absorbed therein even though it eventually passes through the masking layer. The term "absorbed" is therefore broadly defined herein to include any radiation which is not reflected. As a result of the illumination profile 60, the absorption response of layer 56 is shifted such that higher temperature regions of the layer 56 transmit an increased amount of the incident radiation, while lower temperature regions, such as those toward the left and right edges of profile 60, transmit less incident radiation than the higher temperature regions. This shift in the absorption response of layer 56 results in the dashed illumination profile 64 shown on surface 65 of data storage layer 58. Without the shift in absorption response, masking layer 56 may have transmitted considerably less incident radiation than the amount indicated by illumination profile 64. It can be seen that the temperature-induced shift in the absorption response of the masking layer 56 produces a narrower illumination profile on surface 65. As noted above, this narrower illumination profile can provide significant improvements in both recording and readout resolution. In this embodiment, the data storage layer 58 need not exhibit a response shift, although in other embodiments both layers 56 and 58 could exhibit such a shift. Of course, any of a number of other techniques could be applied to utilize an induced shift in the absorption response of a masking layer and/or a data storage layer of an optical recording medium in accordance with the present invention.

In general, the masking layer 56 undergoes heating as part of its intrinsic function and also due to its proximity to the active data storage layer 58. It should be noted that appreciable amounts of thermally-induced damage, deterioration, or alteration of the masking layer may interfere with the data readout function and be manifested as an undesirable increase in noise or data unreliability. This effect may be alleviated by adhering to one or both of the following design guidelines. First, the masking layer 56 should have a marking or damage threshold well in excess of that of the data storage layer. It is well-known that altering the chemical constituents or substitution groups of the materials exhibiting a given absorption response alters their intrinsic marking threshold temperature or sensitivity. Such alterations are described in, for example, the above-cited U.S. Patents pertaining to dye-based recording media, and can be readily employed to design materials that display an enhanced insensitivity and immunity to laser damage during both (i) illumination and absorption and (ii) proximal heating. Second, the masking layer 56 should be designed such that the temperature elevation due solely to incident radiation absorption is well below its marking or damage threshold. In the event the threshold of the data storage layer is in excess of the marking or damage threshold of the masking layer, a relatively thin thermal isolation layer can, be inserted between the masking and data storage layers. The characteristics of the thermal isolation layer, such as thickness, optical properties and thermal properties, can be readily optimized by one skilled in the art through the application of standard methods in optics and heat transfer theory. The thickness of the isolation layer should be chosen such that it does not counter the beam-narrowing effect of the masking layer and should, therefore, be on the order of the depth of focus of the illuminating radiation beam.

Although the foregoing detailed description has illustrated the present invention primarily in terms of a particular optical recording system, it should be understood that the present invention may be used in any of a number of other optical systems. Many variations may be made in the arrangements shown, including, for example, the type of optical source used to generate the radiation beam, the type of optical recording medium used, the shape of the medium absorption response, the type of induced shift, the placement of the radiation beam wavelength relative to the medium absorption edge, and the type and arrangement of optical components used for directing and processing the radiation beam in the optical system. These and other alternatives in variations will be readily apparent to those skilled in the art, the present invention is therefore limited only by the appended claims.

PARTS LIST $\lambda_1$ first wavelength
$\lambda_2$ second wavelength
$\lambda_3$ third wavelength
P1–P7 temperature end points
$P_{TH}$ recording threshold power level
10 optical recording system
12 data source
15 optical source
16 optical hardware
17 collimating lens
18 polarization beam splitter
19 surface
20 quarter-wave plate
22 lens
25 optical recording medium
26 detector focusing lens
28 detector array
32 actuator
50 optical recording medium
54 transparent substrate
56 masking layer
58 data storage layer
60 illumination profile
61 masking layer surface
64 illumination profile
65 data storage layer surface

What is claimed is:

1. An optical recording system comprising:

an optical source to generate a radiation beam at a first wavelength, wherein said first wavelength is between a second and a third wavelength, and is modulated by recording data; and an optical recording medium to which said radiation beam is applied, said medium having an absorption response with an absorption edge between said second and said third wavelength such that an amount of radiation absorbed by said medium varies as a function of wavelength for wavelengths between said second and said third wavelength;

wherein said radiation beam induces a shift in said absorption response in a region of said medium illuminated by said beam such that said medium absorbs additional radiation at said first wavelength.

2. The system of claim 1 wherein said absorption edge includes a substantial decrease in absorption from said second wavelength to said third wavelength.

3. The system of claim 2 wherein said substantial decrease in absorption includes an absorption value at said second wavelength which is at least ten percent less than an absorption value at said third wavelength.

4. The system of claim 2 wherein said second wavelength is shorter than said third wavelength.

5. The system of claim 1 wherein said additional radiation is at least five percent more radiation than that absorbed by said region of said medium at said first wavelength prior to said shift in said absorption response.

6. The system of claim 1 wherein said optical source is connected to and directly modulated by a data source supplying said recording data.

7. The system of claim 1 wherein said optical recording medium is a dye-based optical recording medium having a transparent substrate and a data storage layer underlying said substrate.

8. The system of claim 1 further including means for applying said radiation beam to said medium, wherein said means comprises:
   a polarization beam splitter arranged between said optical source and said recording medium to linearly polarize said radiation beam;
   a quarter-wave plate arranged between said polarization beam splitter and said medium to circularly polarize said radiation beam; and
   a lens arranged between said quarter-wave plate and said recording medium to direct said beam onto said medium.

9. The system of claim 1 wherein said medium includes a transparent substrate, a masking layer underlying said substrate, and a data storage layer underlying said masking layer, and wherein said shift in said absorption response occurs in said masking layer such that said additional radiation absorbed in said masking layer at said first wavelength is transmitted to said data storage layer.

10. A method of optical data recording comprising the steps of:
    generating a radiation beam at a first wavelength, wherein said first wavelength is between a second and a third wavelength;
    modulating said radiation beam with data to be recorded on said medium;
    providing an optical recording medium having an absorption response with an absorption edge between said second and said third wavelength such that an amount of radiation absorbed by said medium varies as a function of wavelength for wavelengths between said second and said third wavelength;
    applying said radiation beam to said recording medium; and
    inducing a shift in said absorption response of said recording medium such that said medium absorbs additional radiation at said first wavelength.

11. The method of claim 10 wherein said step of providing said optical recording medium includes providing said medium with said absorption edge including a substantial decrease in absorption from said second wavelength to said third wavelength.

12. The method of claim 11 wherein said substantial decrease in absorption includes an absorption value at said second wavelength which is at least ten percent less than an absorption value at said third wavelength.

13. The method of claim 11 wherein said second wavelength is shorter than said third wavelength.

14. The method of claim 10 wherein said additional radiation is at least five percent more radiation than that absorbed by said region of said medium at said first wavelength prior to said shift in said absorption response.

15. The method of claim 10 wherein said steps of generating and modulating said radiation beam further include providing a data source connected to and directly modulating said optical source.

16. The method of claim 10 wherein said step of providing said optical recording medium includes providing a dye-based optical recording medium having a transparent substrate and a data storage layer underlying said substrate.

17. An optical recording system comprising:
    an optical source to generate a radiation beam at a first wavelength, wherein said first wavelength is between a second and a third wavelength; and
    an optical recording medium to which said radiation beam is applied, said medium having a substrate and a layer underlying said substrate, said layer having an absorption response such that an amount of radiation absorbed by said layer varies as a function of wavelength for wavelengths between said second and said third wavelength;
    wherein said radiation beam induces a wavelength shift in said absorption response in a region of said layer illuminated by said beam such that said layer absorbs a different amount of radiation at said first wavelength.

18. The system of claim 17 wherein said layer is a masking layer and said system further includes a data storage layer underlying said masking layer.

19. The system of claim 18 wherein said masking layer absorbs an additional amount of radiation at said first wavelength, such that a portion of said additional amount of radiation is transmitted to said underlying data storage layer.

20. The system of claim 17 wherein said layer is a data storage layer and said data storage layer absorbs an additional amount of radiation at said first wavelength.

\* \* \* \* \*